Figure 1:
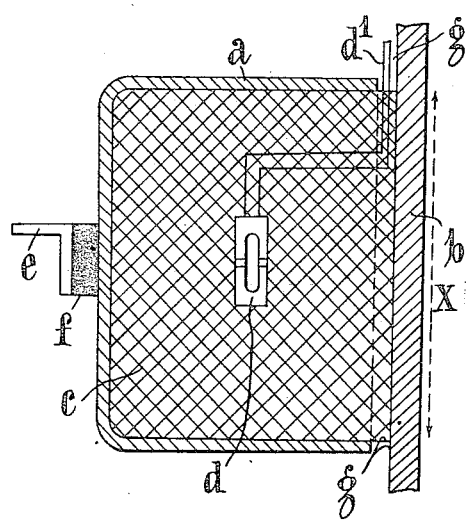

S. M. DAVISON.
SUBAQUEOUS AUDIBLE SIGNALING APPARATUS.
APPLICATION FILED APR. 13, 1914.

1,121,986.  Patented Dec. 22, 1914.

WITNESSES.
C. A. Walter.
W. A. Linden.

INVENTOR.
SIDNEY MITCHELL DAVISON.
by R. H. Wadden
Attorney

UNITED STATES PATENT OFFICE.

SIDNEY MITCHELL DAVISON, OF LONDON, ENGLAND, ASSIGNOR TO MARCONI'S WIRELESS TELEGRAPH COMPANY LIMITED, OF LONDON, ENGLAND.

SUBAQUEOUS AUDIBLE SIGNALING APPARATUS.

1,121,986.    Specification of Letters Patent.    Patented Dec. 22, 1914.

Application filed April 13, 1914. Serial No. 831,574.

*To all whom it may concern:*

Be it known that I, SIDNEY MITCHELL DAVISON, a citizen of the United States of America, residing at London, in England, have invented certain new and useful Improvements in Subaqueous Audible Signaling Apparatus, of which the following is a specification.

This invention relates to improvements in subaqueous audible signaling apparatus, and consists in the use in a receiving device, including an electric transmitter, of certain solid materials other than metals, woods, granite, stone, glass or the like, such materials including mineral and other waxes, resin, tallow, beeswax, pitch, stearin, spermacetti, shellac, and similar materials, the latter materials being good or fairly efficient conductors of sound as compared with water, and being solidified at average atmospheric temperature. Such substances have as compared with metals a comparatively low melting point, and should preferably have a specific gravity (density) near that of water (viz. higher than air and other gases and lower than the metals, etc.). I also prefer to use a solid that is a non-conductor of electricity and antipathic to water.

Submarine signal receiving apparatus, to be efficient for navigational purposes, must allow an observer to hear the submarine bell at a considerable distance when the dynamos, pumps or engines are running, and I have discovered that a solid may be used provided the electric transmitter is not in relatively high conductive connection with the hull of a steamer.

Solids having an elasticity and specific gravity approximating that of water are preferable, and I propose to use paraffin wax, its specific gravity being approximately between .874 and .9 as compared with 1 of water, and the speed of sound in a rod of this material is about 4700 feet per second at a temperature of 63° F., approximating the average velocity of sound in water. The amount of reflection and the amplitude of the refracted ray depend upon the elasticity (sound conducting quality) and density of the two media; there will thus be practically no loss of energy in the use of this material as compared with water, and the wax has other desirable qualities which render it incomparably superior to water.

The use of a suitable solid such as paraffin-wax overcomes difficulties caused firstly by the leakage of water or other liquid contained in a receiving vessel within a ship whereby if the liquid leaks to any great extent the receivers become either inoperative or inefficient depending upon the degree of leakage, and secondly a microphone submerged in liquid will in time become grounded through leakage of the liquid or moisture into the chamber containing the carbon transmitter, and when this occurs the efficiency of said transmitter becomes impaired to an extent dependent upon the extent of leakage and upon the amount of salt contained in the water (salt rendering water, as is well known, a good conductor of electricity). In some cases the transmitter may become entirely inoperative from this cause. In extremely cold climates the water freezes and will destroy the electric transmitter if it is left in said water; and if taken out the apparatus is rendered inoperative.

As paraffin wax is moisture proof, a non-conductor of electricity, and a solid at ordinary temperatures, its advantages over liquids at once become apparent, when its density and sound conducting qualities are taken into consideration.

It is not desirable to use a telephonic transmitter mounted on metal or wood which is part of the hull of the ship, or that has contact with any solid material of high sound conductive qualities, because the noises produced by engines, pumps, or otherwise, within the ship, tend to or actually overcome the signal sounds (whether or not there has been any attempt to "tune" the transmitter) to an extent dependent upon the distance from the signal, or the intensity of same.

The longitudinal vibrations in the hull of a ship, caused by engine noises etc. do not have so great a tendency to affect materials in contact with the hull when said materials are both lower in specific gravity and less efficient in sound conducting qualities than said hull, this being true as regards water and other comparatively light liquids, but the disadvantages of water or liquids have already been dealt with.

I prefer to use a wax, or other suitable material as specified, having good sound conducting qualities and of high specific gravity (comparatively speaking) and I may combine certain of said materials. It is desirable to use a substance of a waxy nature, such as paraffin wax, which will have a sufficient adhesiveness to remain attached to the skin of the ship, etc. in order that the conducting medium will not be broken; which might occur with the use of a hard, brittle material. Rubber, a spring or other means may be used for maintaining pressure on the paraffin wax to cause it to press against the ship's plating.

If rubber is used for sound insulating purposes it will be necessary to protect it if any material is used in the receiver which will chemically attack same; the method to depend upon the chemical action of the material used.

A further feature of the invention is in so arranging the telephonic transmitter that the heaving of a ship in a rough sea does not alter, at least to any degree, the water pressure on the diaphragm of the telephonic transmitter this being accomplished by embedding the telephone transmitter or its containing case, in the paraffin wax or other specified solid, or by introducing a second diaphragm exposed directly to water, or by a combination of both these means.

The heaving of the ship alters the sensitiveness of the microphone when its diaphragm is directly exposed to the water and direction can not therefore be accurately ascertained. I propose to use any type of electric telephonic transmitter and this covers inertia, solid back or any other type, and they may be supported in a case, the latter embedded in wax; the wax may be poured entirely around the transmitter and against the diaphragm, or the transmitter may be in a metallic case and the latter insulated from the former by rubber or other suitable means, or any other design or disposal found suitable; the method of arranging the microphone will depend to a large extent under what conditions they are to be used, the size of the vesesl &c.

I generally find is preferable to have the solid matter in contact with the diaphragm of a solid back type transmitter if the receiver is to be used when the ship's engines are running. I also contemplate the use of microphone transmitters including a diaphragm of definite pitch, which would not become altered if the transmitter case is embedded in the wax and were so arranged that the diaphragm was allowed to remain in free air. This would allow of using a very sensitive transmitter specially useful for obtaining long distance signals when a ship is stopped.

It is believed that the volume of sound received depends upon the area of the receiver in contact with the hull of the ship and this may be made very large when paraffin wax is employed. This is impracticable when water or other liquid is employed, owing to the difficulty and expense of making and keeping joints water-tight, but with paraffin wax a wooden container will suffice.

Figure 2:
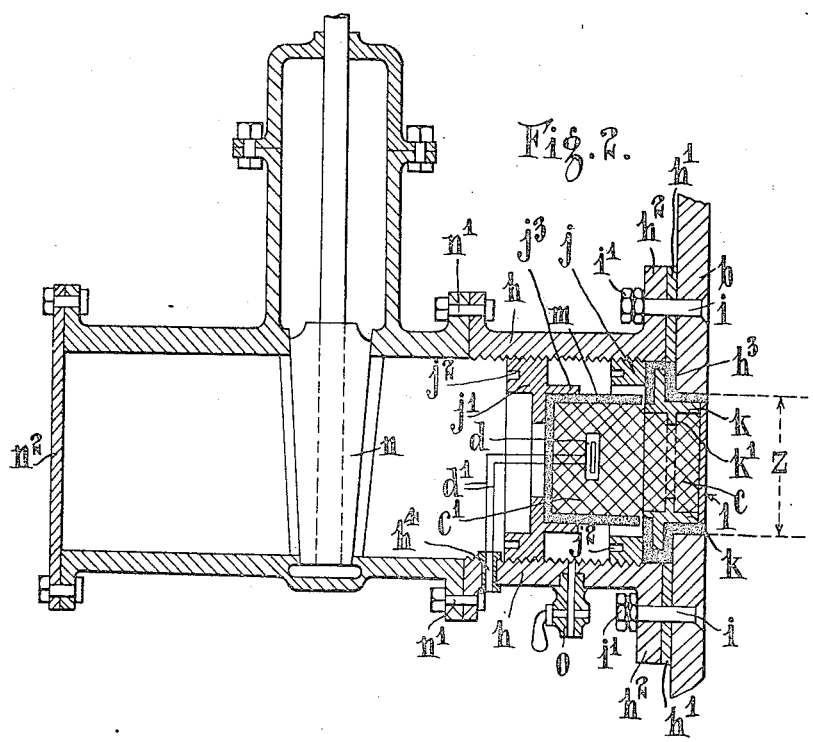

The accompanying drawings illustrate embodiments of means suitable for carrying out the invention, Figures 1 and 2 being sections of two different or alternative forms of construction of receiving devices for the signaling apparatus.

Referring to Fig. 1, which shows one method of carrying out the invention with the use of the wax or other materials above suggested or mentioned, I provide a shell $a$ preferably of metal (although where a very large receiving area is obtained wood could be used) having a comparatively large receiving area or surface $x$ set close to the inner side of the hull $b$ of a vessel, said shell containing the paraffin wax or other material or materials $c$ in direct contact with the vessel's hull and one, two or more telephone transmitters $d$ suitably arranged in said wax or material, one of such being shown, electrically connected as by wires $d^1$ to a telephone receiver, or other receiving device (not shown) on the bridge of the vessel or at other suitable location. The wax may be held in close contact with the hull by a bracket $e$ between which and the shell is a rubber block or gasket $f$ for insulating said shell from internal ship's noises through said bracket $e$, but it is not intended that this invention shall be construed as being limited to these means, as any other appropriate devices may be adopted. As shown in this figure, the shell which protects the wax from destruction and secures same in place is filled with the wax for a distance slightly beyond the outer edge of the latter in order to leave a space $g$ between the shell and the ship's hull to avoid direct contact between said shell and hull, this space also serving as shown for passage of the wires from the transmitter.

Fig. 2 of the accompanying drawings shows a second method of applying the invention to receivers on board ship, where signals over extreme distances are desired or required, such as on naval ships and large ocean going passenger steamers, and is a very important feature of the invention. In this method I remove a portion of the ship's hull or plating, of moderate size, as at $z$, (or provide a number of holes of small diameter) and provide a strong metal casing or receiver $h$ against the inner side of the hull over said removed portion or portions, said receiver being strongly constructed and either attached directly to the hull or insulated from same by rubber or other gaskets. In the construction illustrated in the drawing a gasket $h^1$ as of canvas soaked in red lead is inserted between the hull and the flange $h^2$ of the receiver, the latter being secured to the hull by bolts $i$ countersunk into the latter, extending through said flange and secured on the inside by lock nuts $i^1$.

Around the aperture $z$ in the ship's hull is a sleeve $h^3$ of rubber or other sound insulating material (which also prevents electrolytic action between the iron hull and gun metal container $k$ referred to below) secured in place by a clamping ring $j$ screwed into the threaded interior of the receiver, the said sleeve being so shaped as to receive and hold the container $k$ for a permanent portion of wax $c$ which is flush or substantially so with the outer face of the hull, the container $k$ having a ring, flange or equivalent $k^1$ or other means to assist in holding the wax in position. There may be provided over the outer face of the metal container $k$ and in contact with the wax a thin metallic high pitch or tension diaphragm $l$ to prevent undue wear of the wax by water friction, but I may dispense with this if required.

The clamping ring $j$ and the rubber insulation $h^3$ should be secured together so that the insulation metal container $k$ and wax portion $c$ will be removed together when said ring is unscrewed. The aforesaid clamping ring $j$ also serves to hold the permanent portion of wax $c$ in place through its container $k$, and to the rear of said permanent portion there is provided a shell $m$ of rubber or other appropriate material also containing wax $c^1$ in which is embedded the transmitter $d$, this shell being secured by a second clamping ring $j^1$ screwed into the receiver $h$. This ring $j^1$ having a short sleeve portion $j^3$ embracing the rubber shell $m$, so that the latter may be easily removed. The rings are shown as provided with holes $j^2$ for reception of a tool for screwing them in place. The rubber shell $m$ containing the transmitter is thus capable of being readily removed to inspect said transmitter or insert one of an improved or different type, or for other purpose. The wires $d^1$ from the transmitter are shown as passing through the side of the receiver $h$ through an appropriate gland or equivalent $h^4$.

With this type of apparatus I may provide the receiver $h$ with a gate valve $n$ large enough to allow of the insertion of the telephonic transmitter, and the material $c^1$ in which it is embedded. This valve could be bolted as at $n^1$ to the back of the receiver and there would be no more danger from leakage than with the ordinary sea-valves or the like commonly used on board vessels. This valve can be mounted permanently in position or mounted only when the wax containing the transmitter is to be withdrawn, and when removed the blank flange or plate $n^2$ can be bolted to the flanges of the receiver $h$ when the apparatus is not undergoing overhaul or inspection. There should be sufficient space between the valve gate $n$ and the blank flange $n^2$ mounted in the valve to allow for the convenient withdrawal of the wax containers, so that the gate valve can be shut down when the parts are moved to the back of the valve space. There will also be a stuffing box in the flange to take a key wrench for the holes $j^2$. The receiver could also be held against the hull by insulated angle irons or other means than those shown, and it might also be of advantage to provide a second strong metal casing (not shown) firmly secured to the ship's hull, but not in direct contact with the sound receiving casing $h$, so that a vacuum, or insulating gas chamber, is provided between said two casings. In this double casing construction suitable removable covers should be provided to allow the microphones to be removed from the inner casing, or sufficiently large to remove the entire inner casing. This construction will be readily understood without illustration or further description.

A drip-cock $o$ may be provided on the casing $h$, or on both where an outer casing is provided, in order that a test for leakage could be made before taking a cover off. When using this installation it would probably be desirable to use a wax or substance (especially when the substance is in direct contact with the water in which the vessel floats) of fairly hard qualities, in order to reduce the loss caused by wear on said material by the friction of the water, and further it would be advisable to provide some means of preserving a smooth surface, since if the surface of said material were allowed to become roughened water noises would be considerably increased. The aforesaid thin diaphragm $l$ under tension would be one means of effecting this purpose.

An important advantage of having the wax in direct contact with the water would be that owing to the sound conducting medium in the receivers consisting of a material having a specific gravity (or density) and possessing sound conducting qualities, approximating that of the exterior water, the loss of sound from the signal by reflection would be negligible as compared with that caused by the sound vibrations having to traverse steel or iron, the theoretical critical angle for sound waves from water to steel being about $16\frac{1}{2}$ degrees and from water to paraffin almost 90 degrees taking 63 degrees for the water temperature and as the specific gravity is .9 compared with 1 for water, the amplitude of the refracted ray will about equal the amplitude in the water itself. The great advantage when the sound producing device is ahead or bearing a few points on the bow is thus obvious. The pin diaphragm $l$ would probably decrease the critical angle somewhat, but one of suitable thickness (being say .04 inches thickness and under tension) and pitch ought not to have a very detrimental effect, and the intensity of said sound vibrations reaching the transmitting apparatus would be considerably increased over that received by an internal receiver pressed against the plating. The rubber $h^3$ and $m$ insulates the container from the engine noises.

By embedding the transmitter in the wax or other material as described, change of pressure in the external water does not cause a change of pressure in the diaphragm of said transmitter and therefore tends to exclude any liability of the direction of the signal being incorrectly determined.

A still further type of apparatus is one suitable for overboard use, that is, the entire receiving apparatus submerged in the water. The transmitter would be suitably incased so that the water would not cause a change of pressure on the diaphragm and could not leak into the containing casing. This type would allow of the use of a microphone of very sensitive design, and the diaphragm could be used in free air so that there would.be no damping effect, or change of pitch, and restraint from free movement, so that signals over greater distances could be obtained than is possible with other types of receiver. This would be especially desirable for use in warships and submarines while at anchor or not under way, to detect the approach of an enemy's ship, or distant signals from one of their own ships.

It is intended that this invention shall cover the use of all waxes and other materials specified in all applications to any type of submarine signal receiving appratus, for example, on board ship, whether they are entirely within the ship, exposed through the plating or flush with the outside of the hull, entirely overboard or otherwise, or other applications wherein the sound conducting quality of the material, and its specific gravity, are the prime factors.

What I claim as my invention and desire to secure by Letters Patent of the United States is:—

1. In a subaqueous audible signal receiving apparatus, an electric transmitter disposed out of high conductive connection with the hull of the vessel in which it is located, and a receiving medium in conductive connection with said transmitter and with the water in which the vessel floats, consisting of a substance solid at ordinary temperatures and of comparatively low melting point.

2. In a subaqueous audible signal receiving apparatus, an electric transmitter disposed out of high conductive connection with the hull of the vessel in which it is located, and a receiving medium in conductive connection with said transmitter and with the water in which the vessel floats, said receiving medium consisting of a substance solid at ordinary temperatures and of comparatively low melting point, having a sound conductive quality less than or not greatly exceeding that of water and having a specific gravity approximating that of water.

3. In a subaqueous audible signal receiving apparatus, an electric transmitter disposed out of high conductive connection with the hull of the vessel in which it is located, and a receiving medium in conductive connection with said transmitter and with the water in which the vessel floats, said receiving medium consisting of a substance solid at ordinary temperatures and of comparatively low melting point and having a sound conductive quality approximating that of water.

4. In a subaqueous audible signal receiving apparatus, an electric transmitter disposed out of high conductive connection with the hull of the vessel in which it is located, and a receiving medium in conductive connection with said transmitter and with the water in which the vessel floats, said receiving medium being a substance which is solid at ordinary temperatures and of comparatively low melting point, having a sound conductive quality less than or not greatly exceeding that of water, and being antipathic to the latter.

5. In a subaqueous audible signal receiving apparatus, an electric transmitter disposed out of high conductive connection with the hull of the vessel in which it is located, and a receiving medium in conductive connection with said transmitter comprising a wax disposed in conductive connection with the water in which the vessel floats.

6. In a subaqueous audible signal receiving apparatus, an electric transmitter disposed out of high conductive connection with the hull of the vessel in which it is located, and a receiving medium in conductive connection with said transmitter comprising paraffin wax disposed in conductive connection with the water in which the vessel floats.

7. In a subaqueous audible signal receiving apparatus, the combination of an electric transmitter disposed out of high conductive connection with the hull of the vessel in which it is located, and with the water in which the vessel floats, and a sound receiving medium in which said transmitter is embedded consisting of a substance solid at ordinary temperatures, of comparatively low melting point and having a sound conductive quality less than or not greatly exceeding that of water.

8. In a subaqueous audible signal receiving apparatus, the combination of an electric transmitter, disposed out of high conductive connection with the hull of the vessel in which it is located, and a sound receiving medium in which said transmitter is embedded consisting of paraffin wax.

9. A subaqueous audible signal receiving apparatus adapted for use on board ship, comprising a protecting or insulating casing accessible from within the ship, an electric telephone transmitter out of high conductive connection with the hull of the vessel in which the apparatus is located within said casing and having a diaphragm, means whereby the transmitter may receive sound vibrations from without the ship, without passing through any thick plating, a sound receiving medium in conductive connection with said transmitter comprising a substance solid at ordinary temperatures and of comparatively low melting point, and a tensioned metallic diaphragm other than that of the telephone transmitter in contact with the sound receiving medium whereby change of pressure in the external water fails to cause a material change of pressure in the transmitter diaphragm.

10. In a subaqueous audible signal receiving apparatus, the combination of an electric transmitter disposed out of high conductive connection with the hull of the vessel in which it is located, a permanent portion of sound receiving medium solid at ordinary temperatures and of comparatively low melting point in conductive contact with the water in which the vessel floats, and a removable portion of said sound receiving medium in which said transmitter is embedded normally in contact with said permanent portion of the receiving medium.

11. In a subaqueous audible signal receiving apparatus, the combination of an electric transmitter disposed out of high conductive connection with the hull of the vessel or equivalent in which it is located, the wall of said vessel having an aperture, a sound receiving medium consisting of a substance solid at ordinary temperatures and of comparatively low melting point in contact with said receiver and extending through the aforesaid aperture, and a thin tension diaphragm placed over the surface of the receiving medium which extends through said aperture.

In witness whereof I have signed this specification in the presence of two witnesses.

SIDNEY MITCHELL DAVISON.

Witnesses:
  A. J. HADDAN,
  H. P. VERM.